US010701371B1

(12) United States Patent
Boll et al.

(10) Patent No.: US 10,701,371 B1
(45) Date of Patent: Jun. 30, 2020

(54) LOSSLESS COMPRESSION OF HIGH FRAMERATE IMAGERY

(71) Applicant: BAE Systems Information and Electronic Systems Integration Inc., Nashua, NH (US)

(72) Inventors: Zachary J. Boll, Nashua, NH (US); Michael N. Mercier, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 43 days.

(21) Appl. No.: 16/169,639

(22) Filed: Oct. 24, 2018

Related U.S. Application Data

(60) Provisional application No. 62/576,924, filed on Oct. 25, 2017.

(51) Int. Cl.
*H04N 19/17* (2014.01)
*H04N 19/176* (2014.01)
*G06F 3/0484* (2013.01)

(52) U.S. Cl.
CPC ......... *H04N 19/17* (2014.11); *G06F 3/04842* (2013.01); *H04N 19/176* (2014.11)

(58) Field of Classification Search
CPC ... H04N 19/17; H04N 19/176; G06F 3/04842
USPC ...................................... 375/240.01
See application file for complete search history.

(56) References Cited

U.S. PATENT DOCUMENTS

| 2003/0156649 | A1* | 8/2003 | Abrams, Jr. ......... | G11B 27/034 375/240.24 |
| 2012/0134551 | A1* | 5/2012 | Wallace ......... | H04N 21/234327 382/128 |
| 2016/0198471 | A1* | 7/2016 | Young .................. | H04W 16/14 370/329 |

\* cited by examiner

*Primary Examiner* — Nguyen T Truong
(74) *Attorney, Agent, or Firm* — Scott J. Asmus; Sand, Sebolt & Wernow LPA

(57) ABSTRACT

A system for lossless compression of high frame rate imagery includes at least one non-transitory computer readable storage medium having instructions encoded thereon that, when executed by at least one processor, implement operations to compress high frame rate imagery in a lossless manner, the at least one non-transitory computer readable storage medium including: logic to encode frame deltas to decrease pixel dynamic range; logic to localize frame deltas; and logic to encode subframes with lookback history to further decrease pixel dynamic range for temporary obstructions.

18 Claims, 8 Drawing Sheets

| Flight # | 500 Hz Raw Data Size (GB) | 500 Hz Compressed Data Size (GB) | Compression Ratio |
|---|---|---|---|
| 1 | 1883.5 | 374.3 | 5.03 |
| 2 | 1300.4 | 260.1 | 5.00 |
| 3 | 1022.6 | 208.7 | 4.90 |
| 4 | 2047.0 | 428.5 | 4.78 |
| 5 | 1901.0 | 381.6 | 4.98 |
| 6 | 2405.6 | 491.2 | 4.90 |
| 7 | 552.0 | 109.6 | 5.04 |
| 8 | 1526.1 | 326.8 | 4.67 |
| 9 | 1920.0 | 399.1 | 4.81 |
| 10 | 1295.7 | 263.9 | 4.91 |
| 11 | 1336.6 | 267.0 | 5.01 |

FIG. 5

| Flight # | 500 Hz Raw Data Size (GB) | 500 Hz Compressed Data Size (GB) | Compression Ratio | Entropy Compression Ratio |
|---|---|---|---|---|
| 1 | 1883.5 | 374.3 | 5.03 | 5.33 |
| 2 | 1300.4 | 260.1 | 5.00 | 5.19 |
| 3 | 1022.6 | 208.7 | 4.90 | 5.16 |
| 4 | 2047.0 | 428.5 | 4.78 | 4.99 |
| 5 | 1901.0 | 381.6 | 4.98 | 5.14 |
| 6 | 2405.6 | 491.2 | 4.90 | 5.10 |
| 7 | 552.0 | 109.6 | 5.04 | 5.19 |
| 8 | 1526.1 | 326.8 | 4.67 | 4.89 |
| 9 | 1920.0 | 399.1 | 4.81 | 5.03 |
| 10 | 1295.7 | 263.9 | 4.91 | 5.10 |
| 11 | 1336.6 | 267.0 | 5.01 | 5.17 |

FIG. 7

LOSSLESS COMPRESSION OF HIGH FRAMERATE IMAGERY

CROSS-REFERENCE TO RELATED APPLICATIONS

This application claims the benefit of U.S. Provisional Patent Application No. 62/576,924, filed on Oct. 25, 2017, which is herein incorporated by reference in its entirety.

BACKGROUND

Technical Field

The present disclosure relates generally to systems and processes for compressing data. More particularly, the present disclosure relates to image compression.

Background Information

Image compression is a type of data processing that compresses images obtained from a sensor (such as a camera or infrared (IR) sensor) from a larger first format to a smaller second format. The smaller or reduced second format is more manageable for data storage and transmission. Various algorithms or processes may be executed to compress imagery data in either a lossy manner or a lossless manner.

Some exemplary methods for lossless image compression include: run-length encoding (used in default method in PCX and as one of possible in BMP, TGA, TIFF), area image compression, DPCM and Predictive Coding, entropy encoding, Adaptive dictionary algorithms (such as LZW— used in GIF and TIFF), deflation (used in PNG, MNG, and TIFF), and chain codes. One exemplary method for lossy compression includes reducing the color space to the most common colors in the image and the selected colors are specified in the color palette in the header of the compressed image. Each pixel just references the index of a color in the color palette, this method can be combined with dithering to avoid posterization. Notably, there are other methods for lossy compression as well.

SUMMARY

Issues continue to exist with compressing images. More particularly, as focal planes used for threat warning or threat detection increase in resolution and increase framerates, standard A-kit designs are unable to handle the data rate(s). Additionally, implementing higher bandwidth optical A-kits are expensive and require high transmission powers. Although standard imagery and video compression algorithms are available, these standard algorithms are typically lossy and degrade small point source signals. The degradation of small point source signals by standard compression algorithms is a significant problem in threat detection inasmuch as threats (such as an incoming enemy missile or hostile fire) typically generate small point source signals. The present disclosure addresses these and other issues by providing a compression algorithm (or compression instructions or a compression process) in a system and implemented in a method to identify small point source signals at high framerates and high resolution while compressing the data to manageable format. In one implementation, the compression process operates with high fidelity/resolution (such as at least 14 bit resolution) and high framerates (such as at least 500 MHz) to at least achieve 4:1 lossless compression (and often 5:1 lossless compression), which is below a lower threshold or "noise floor" so as to not affect threat warning performance.

In accordance with one aspect, an embodiment of the present disclosure provides a data compression system that operates on the principles of calculating localized frame deltas and then encoding the localized delta pixels. A feature of the compression system is that each localized frame delta is computed with a variable length lookback into the temporal frame history. This variable length temporal lookback allows for better compression rates for temporary frame obstructions, such as a helicopter rotor slicing the pixel frame.

In one aspect, an exemplary embodiment of the present disclosure may provide a system for lossless compression of high frame rate imagery comprising: a sensor to capture imagery data and at least one non-transitory computer readable storage medium having instructions encoded thereon that, when executed by at least one processor, implement operations to compress high frame rate imagery in a lossless manner, the at least one non-transitory computer readable storage medium including: logic to encode frame deltas to decrease pixel dynamic range; logic to localize frame deltas; and logic to encode subframes with lookback history to further decrease pixel dynamic range for temporary obstructions. The system of this embodiment or another exemplary embodiment may further provide key frames occurring once every 512 frames. The system of this embodiment or another exemplary embodiment may further provide logic to loop through subframes; logic to find maximum and minimum value in each subframe; logic to encode minimum pixel value in a subframe header; logic to subtract the minimum value in each subframe from the maximum value in the same subframe to define a subframe pixel size. The system of this embodiment or another exemplary embodiment may further provide logic to encode the subframe pixel size to the subframe header; logic to subtract the subframe minimum from the subframe pixel size to determine unsigned pixels in a key frame. The system of this embodiment or another exemplary embodiment may further provide logic to subtract a first delta frame from the key frame; logic to loop through subframes; logic to find maximum and minimum delta pixel value in each subframe; and logic to subtract the minimum delta pixel value in each subframe from the maximum delta pixel value in the same subframe to define a delta frame pixel size. The system of this embodiment or another exemplary embodiment may further provide logic to encode the subframe pixel size to the subframe header; and logic to encode the delta frame with a lookback depth equal to one. The system of this embodiment or another exemplary embodiment may further provide logic to encode signed pixels to subframe payload. The system of this embodiment or another exemplary embodiment may further provide logic to subtract a N delta frame from a N−1 delta frame, wherein N is any integer greater than seven; logic to loop through subframes; logic to find maximum and minimum delta pixel values for lookback depths from one to eight. The system of this embodiment or another exemplary embodiment may further provide logic to select a lookback depth that generates the minimum delta pixel value. The system of this embodiment or another exemplary embodiment may further provide logic to encode the subframe pixel size to the subframe header; logic to encode the subframe lookback depth to the subframe header; and logic to encode signed pixels to the subframe payload.

In another aspect, an exemplary embodiment of the present disclosure may provide a method for imagery compression comprising: encoding frame deltas to decrease pixel dynamic image; localizing frame deltas; encoding subframes with lookback history to further decrease pixel dynamic range for temporary obstructions; and wherein the high frame rate imagery compression achieves 4:1 lossless compression. The method of this embodiment or another exemplary method may further provide effecting key frames to occur once every 512 frames. The method of this embodiment or another exemplary method may further provide looping through subframes; determining maximum and minimum value in each subframe; encoding minimum pixel value in a subframe header; and subtracting the minimum value in each subframe from the maximum value in the same subframe to define a subframe pixel size. The method of this embodiment or another exemplary method may further provide encoding the subframe pixel size to the subframe header; and subtracting the subframe minimum from the subframe pixel size to determine unsigned pixels in a key frame. The method of this embodiment or another exemplary method may further provide subtracting a first delta frame from the key frame; looping through subframes; determining maximum and minimum delta pixel value in each subframe; and subtracting the minimum delta pixel value in each subframe from the maximum delta pixel value in the same subframe to define a delta frame pixel size. The method of this embodiment or another exemplary method may further provide encoding the subframe pixel size to the subframe header; and encoding the delta frame with a lookback depth equal to one. The method of this embodiment or another exemplary method may further provide encoding signed pixels to subframe payload. The method of this embodiment or another exemplary method may further provide subtracting a $N^{th}$ delta frame from a N−1 delta frame, wherein N is any integer greater than seven; looping through subframes; and determining maximum and minimum delta pixel values for lookback depths from one to eight. The method of this embodiment or another exemplary method may further provide selecting a lookback depth that generates the minimum delta pixel value. The method of this embodiment or another exemplary method may further provide encoding the subframe pixel size to the subframe header; encoding the subframe lookback depth to the subframe header; and encoding signed pixels to the subframe payload.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

FIG. 5 is a table depicting compression ratios obtain near or around 5 for the compression instructions or compression process of the present disclosure.

FIG. 7 is a table depicting an improvement in the compression ratios with entropy encoding performed subsequent to the compression instructions or compression process of the present disclosure.

Similar numbers refer to similar parts throughout the drawings.

DETAILED DESCRIPTION

Figure 1:
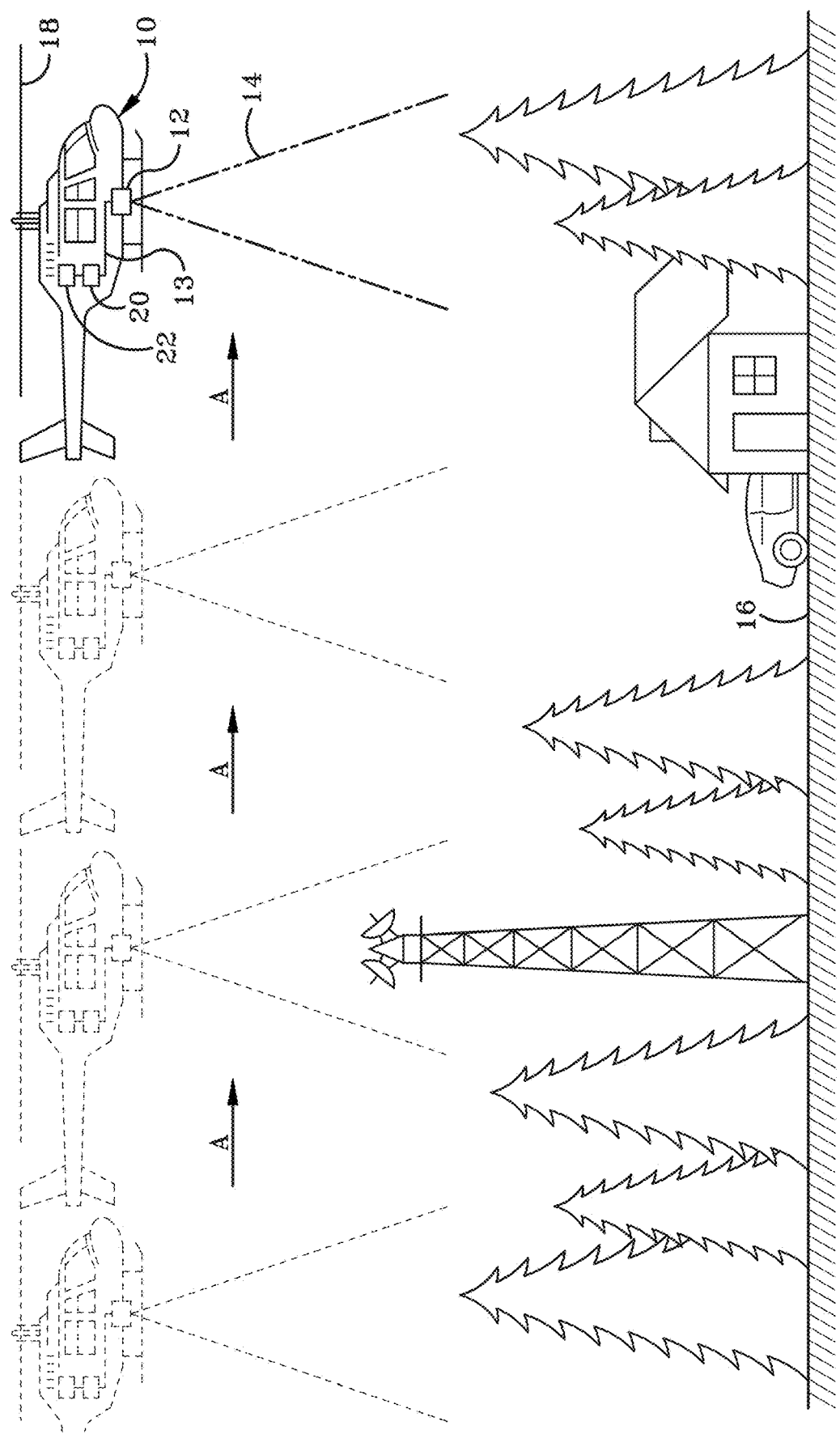
FIG. 1 is a diagrammatic view of a helicopter carrying a sensor, a storage medium, and a processor to implement a set of compressions instructions or compression process of high frame rate images captured by the sensor.

FIG. 1 depicts an airborne platform or vehicle, such as a helicopter 10, carrying a sensor 12 which collects imagery data, as indicated by field of view 14 as the helicopter 10 moves above the ground 16 as indicated by arrow A.

Helicopter 10 includes rotors 18 powered by an engine carried by the helicopter 10 and are configured to provide lift so as to enable flight thereof. As one having ordinary skill in the art understands, the rotors 18 rotate very fast in order to effectuate the lift required to enable flight. Inasmuch as the rotors are elongated members that rotate about a generally vertical axis, it is possible for cameras and other sensors to see through the area occupied by the rotor path when the rotor blade is not temporarily obstructing the view. Notably, the placement of sensor 12 in FIG. 1 is not intended to be limiting and the field of view 14 may be oriented in a manner such that it extends through the path of the rotor 18.

In one particular embodiment, the sensor 12 includes two sensor data collection systems, namely, a first sensor data collection and a second sensor data collection system, which are collectively represented by sensor 12. Further, another implementation of the present disclosure enables sensor 12 to be scaled that could have five sensor data collection systems without upgrading hardware and being able to maintain a similar recording during the duration of the flight. Each sensor data collection system in sensor 12 is formed from a device that is able to record or capture imagery. In one particular embodiment, each sensor data collection system obtains infrared imagery. More particularly, an exemplary infrared imagery sensor is a 256×256 2CIR imagery sensor at 500 hertz (Hz). Additionally, each sensor data collection system in sensor 12 collects 125 megabytes per second data. The data captured may be scaled to 750 megabytes per second for a sixth sensor data collection system, which is still collectively represented as sensor 12. Typically, in a flight having a two-sensor data collection system, it is easy to generate 40 terabytes (TB of 500 hertz) recorded sensor data. Essentially, sensor 12 captures two images or amounts of raw data. Each image is treated as a string and delta frames are used from a single image string. One having ordinary skill in the art understands that the amount of data is significant and a compression process or device is needed that can compress the data in real time for trolling or inflight data collection. An improved compression process or device with compression instructions will increase flight times and decrease sensor data download time.

The present disclosure provides a compression system or algorithm or process or instructions to compress imagery data at high frame rates and high resolution while still achieving lossless compression to a degree that is below a threshold or a "noise floor" so as to not effect threat warning performance. More particularly, sensor 12 is used to collect imagery to effectuate the analyzation of potential threats directed towards the helicopter 10. Thus, the sensor 12 is part of an overall countermeasure system on the helicopter in order to protect the same from incoming enemy or hostile threats, such as missiles or enemy fire. The helicopter 10 carries at least one non-transitory computer readable storage medium 20, in electrical communication with the sensor 12 via electrical transmission line 13 (however the electrical connection may be effectuated in a wireless manner), having instructions encoded thereon that, when executed by at least one processor 22, implements operations to compress high frame rate imagery in a substantially lossless manner obtained by the sensor 12. The instructions encoded on the storage medium 20 that implement the operations include instructions or logic to encode frame deltas to decrease pixel dynamic range, and instructions or logic to localize frame deltas, and instructions or logic to encode subframes with lookback history to further decrease pixel dynamic for temporary obstructions, such as the rotors 18 as they are spinning or rotating.

The compression system or process in accordance with the present disclosure encodes frame deltas to reduce pixel dynamic range. The compression system or process or instructions further reduce pixel dynamic range by localizing frame deltas. In one implementation, the compression instructions implement 8×8 pixel subframes which results in 1,024 subframes per 256×256 pixel frame. The compression system or process or instructions further encode the subframes using a lookback history to decrease pixel dynamic range for temporary obstructions, such as helicopter rotors. As will be described in greater detail below, a key frame occurs once every 512 frames. One having ordinary skill in the art would understand that the key frame may be altered to occur at different time intervals or different frame intervals so as to optimize performance based on specific needs of the system.

Figure 2:
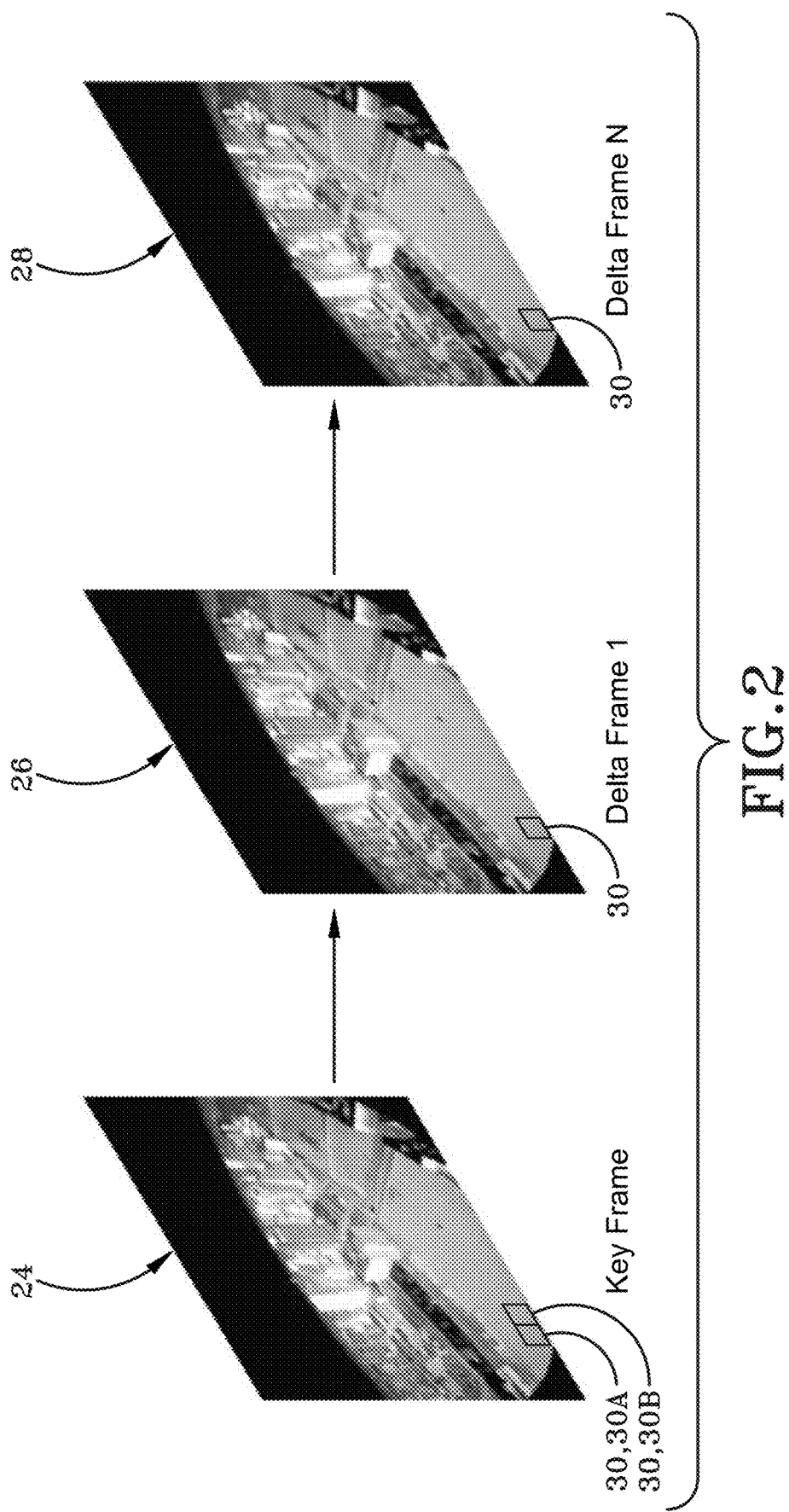
FIG. 2 depicts a key frame, a first delta frame, and an $N^{th}$ delta frame captured by the sensor.

FIG. 2 depicts a key frame 24, a first delta frame 26 and an Nth delta frame 28. Key frame 24, first delta frame 26, and Nth delta frame 28 may be sized in a manner so as to enable each frame to be broken down into a plurality of subframes. In one particular embodiment, each frame is 256×256 pixels. The instructions encoded on storage medium 20 break down the key frame and the delta frames into a plurality of subframes 30. A first subframe 30A is positioned near a second subframe 30B. The number of subframes varies depending upon the pixel size thereof. In one particular embodiment, each of the subframes 30 is 8×8 pixels. In this instance, based on the key frame 24 size (256×256), the number of subframes per frame equals 1,024.

A subframe 30 is a two-dimensional slice of the raw sensor frame (either key frame 24, first delta frame 26, or Nth delta frame 28) where the number of rows and number of columns is a power of two. That is the number of rows and number of columns can be set to 2, 4, 8, 16, 32, 64, and 128. The dimensions of the subframe are configurable in software, but an exemplary fielded configuration used for imagery collection is a square 8 pixel×8 pixel subframe for a total of 64 pixels per subframe 30. The subframes 30 are numbered in raster order format, so that for an 8×8 subframe, the top left subframe 30 is index 0 and the bottom right subframe is index 1023.

The compression instructions stored in storage medium 20 and executed by processor 22 evaluate the key frame 24 and loop through the subframes 30. The compression instructions then find the maximum pixel value and the minimum pixel value in each subframe 30. Maximum and minimum pixel values may be stored in the storage medium 20. Compression instructions then encode minimum pixel value in a subframe header. After encoding the minimum pixel value in the subframe 30 header, subframe pixel size is determined in bits. The subframe header is a description or indicator of how the subframe 30 is formatted. For example, the subframe header may indicate that each pixel is two bits wide based on the delta from a number of frames ago. The subframe header may also indicate whether the subframe was arithmetically encoded. Stated otherwise, the subframe header describes how the subframe was encoded. The subframe pixel size is determined by subtracting the minimum pixel value from the maximum pixel value (max pixel value minus min pixel value equals subframe pixel size). Once the subframe 30 pixel size has been determined, the compression instructions encode the subframe pixel size (in bits) to the subframe header. Thereafter, the compression instructions associate and encode a key frame value equal to the subframe pixel size minus the minimum pixel value. This establishes a number of unsigned pixels. The purpose of the key frame is to be coded without any lookback. This enables the data, when being evaluated subsequent to completion of the compression function, to allow an operator to skip around between key frames. As described below, the compression of the key frame process is different than the delta frame compression process. The key frames are encoded by a different compression instruction or process than the delta frames that enables an operator to skip to various points of the data when evaluating the same. This may be beneficial because in the event some delta frames or one of the key frames becomes corrupted, the remaining portion would also be corrupted. Thus, the key frame acts as a reset location. Every time the data gets to a key frame, the compression instructions or process resets itself.

In one particular embodiment, compressed key frames have no temporal history dependence. This may be convenient for playback (can jump around file) and data stream corruption (can seek to the next key frame to recover from a corruption event). For the 2-color IR RAD sensor 12, the key frame period is nominally set at once per 512 frames, or about one per second with 500 Hz sensor data.

In another particular embodiment, each key subframe 30 can be compressed in parallel with no dependency on other subframes in the image frame. The process for compressing a key subframe is as follows: 1. Find the min/max pixel value in the subframe 30; 2. The max-min pixel defines the pixel size of the subframe (logic defined in Step 1); 3. Populate the common subframe header (Table 2), only the pixel size field is relevant for key subframes; 4. Populate the key subframe header (Table 3) with the minimum pixel size; and 5. For each pixel in the subframe, compute the unsigned pixel delta by doing subframe pixel—min subframe pixel, write these values out to data stream using a packed representation, raster order. See the key subframe pixel size compression instructions (Function 1) provided below.

The first delta frame 26 is an image taken by sensor 12 at a different time from the key frame 24. In one particular embodiment, the helicopter 10 carrying sensor 12 translates a slight distance during the time between the key frame 24 and the first delta frame 26. The first delta frame 26 is also compressed by the compression process or instructions stored on storage medium 20 and executed by processor 22. The first delta frame 26 compression begins by subtracting the first delta frame 26 from the key frame 24. The instructions loop through the subframes 30 in the first delta frame 26. A maximum first delta pixel frame value and a minimum delta frame pixel value is determined for each subframe 30. The maximum and minimum delta pixel values define the subframe pixel size in bits. Wherein the first delta subframe pixel size is determined by subtracting the minimum pixel value from the maximum pixel value. The first delta frame subframe pixel size is encoded to a subframe header. Then the compression instructions encode the first delta frame with a lookback depth equal to one. The instructions then encode signed pixels to a subframe payload. Lookback depth refers to how many frames in the past the instructions or process may look back. In one particular embodiment, the lookback depth is equal to eight frames or less. Stated otherwise, the lookback depth refers to the depth at which a frame delta is generated. For example, each subframe can have a unique lookback depth to maximize compression. The manner in which the lookback depth is determined is an optimization function through an iterative process. Iterations are optimized by determining which iteration minimizes the pixel size so the lookback depth with the minimum difference of pixel delta is selected to optimize and maximize compression. The terms signed pixels and unsigned pixels refer to pixels used for the delta frames and the key frames, respectively. Stated otherwise, the signed pixels used for the delta frames refers to a number centered around zero and has negative and positive values. For example, $-(2^2)$ to $(2^2)-1$. Essentially, a signal pixel is a signed integer representing both positive and negative values. The unsigned pixels for the key frames do not have negative values and represent only positive integers. The unsigned pixels are represented in the key frames because the raw imagery data is unsigned. The manner in which the key frame is encoded with unsigned pixels is that for a given subframe 30, the minimum pixel value is taken and encoded into the subframe header. For all other pixels, the encoded values are signed pixels relating to the delta frames. The subframe payload refers to raw pixel values in a packed format. See also the delta subframe pixel size compression instructions (Function 2) provided below.

The Nth delta frame 28 is compressed by the instructions encoded on storage medium 20 when executed by the processor 22. When executed by the processor 22, the instructions subtract the Nth delta frame 28 from delta frame (N minus one through N minus eight) then, performing a loop through the subframes 30. The maximum and minimum delta pixel values are determined and obtained for lookback depths one through eight. Lookback depth is selected that generates a minimum delta for each subframe 30. Then, subframe pixel size is encoded to a subframe header. The subframe lookback depth is encoded to the subframe header. Then, the signed pixels are encoded to the subframe payload. After the compression process or instructions have been completed for the Nth delta frame, the compressed file is stored in a memory device which may be a solid state memory, such as storage medium 20 carried by helicopter 10. The compressed file may be returned and transferred to a remote site where it may be played back and edited so as to determine what happened during the flight of the helicopter 10. This enables future software or other systems to be developed based on the imagery data collected from the flight of the helicopter. For example, some exemplary software or other systems developed based on the compressed files of the present disclosure are threat detection systems and enemy countermeasure systems.

The data that is collected from the image sensor 12 is at a very high data rate. One exemplary motive for compressing the high data rate data obtained from the sensor 12 is to enable fast processing of the same. Additionally, compression enables fast storage and fast transfer of the data through various networks.

Compressed delta frames are computed using the current raw pixel frame and a temporal lookback into the raw pixel frame history, for example 1 to 4 frames. The exception to this rule is for delta frames that are compressed immediately preceding a key frame. For example, for the first delta frame after a key frame, such as frame 26, the maximum temporal lookback is one frame. The second delta frame after a key frame, the maximum temporal lookback is two frames, and so on.

Each delta subframe can be compressed in parallel with no dependency on other subframes in the current image frame. The compression instructions or process for compressing a delta subframe is as follows: 1. Identify the lookback history based on the last key frame that was compressed. Do not use a frame that precedes the last key frame computed; 2. Compute the delta signed pixel subframes by taking the current subframe and subtracting the previous subframe, depths one through four; 3. Compute the subframe pixel size for frame depths one through four; the depth that generates the minimum subframe pixel size defines the frame lookback depth to use for encoding; (Note the max/min delta signed pixel values define the subframe pixel size) (logic defined in Step 2 above); 4. Populate the common subframe header (an exemplary common subframe header is shown below in Table 2) with pixel size and frame lookback depth; arithmetic encoding bit can be left unused, unless the system determines to implement this feature in a field programmable gate array (FPGA); 5. Write the delta subframe computed in step 3 to the data stream in a packed representation.

Figure 3:
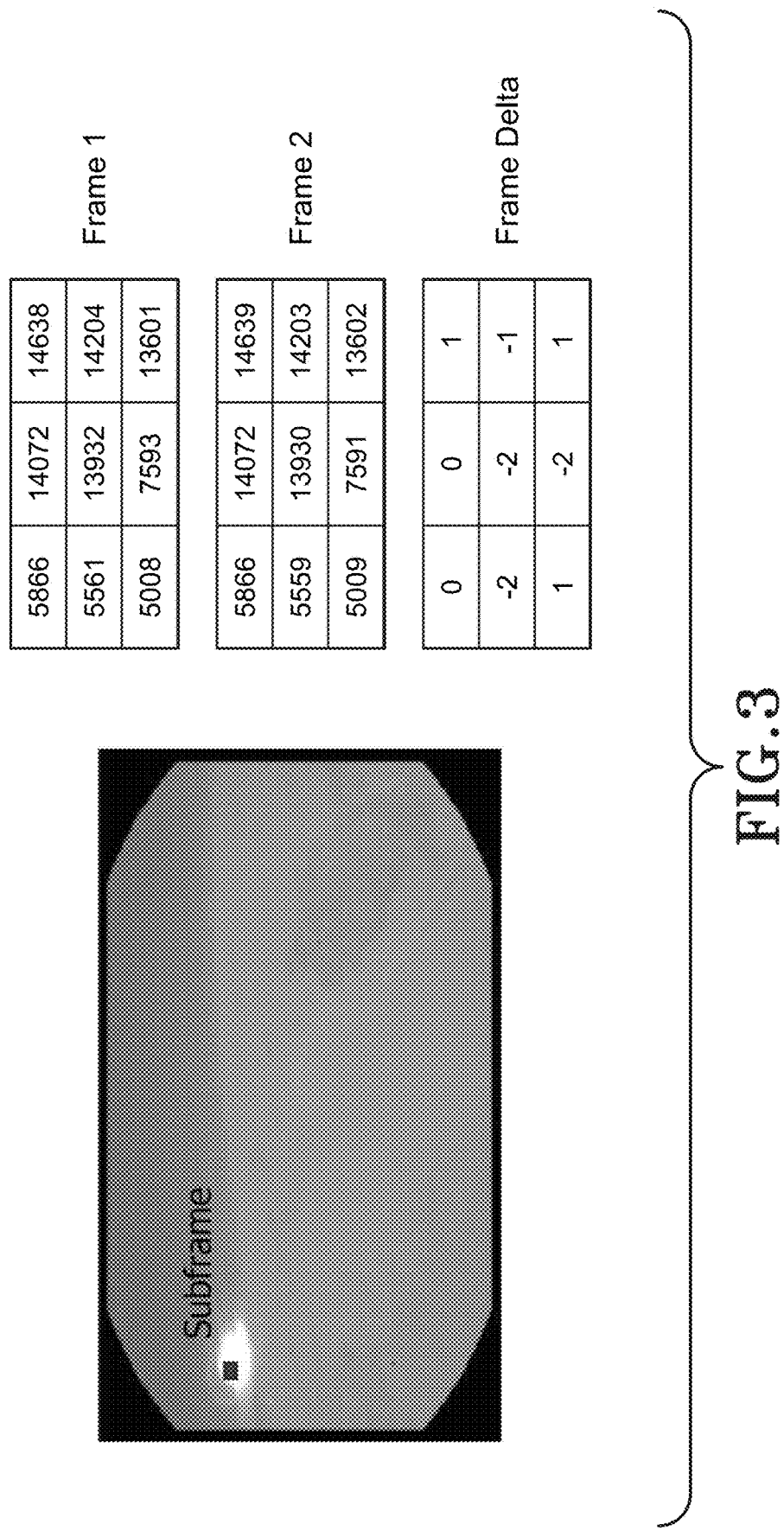
FIG. 3 depicts an exemplary image frame with a subframe around a region representing the sun and corresponding frame tables and a delta frame table representing the difference between the first frame table and the second frame table.

FIG. 3 depicts an exemplary compression of image frames utilizing the compression instructions and process discussed above. FIG. 3 assumes an 8×8 subframe pixel configuration wherein: 1. The process writes a frame header, key frame (Table 4); 2. For subframes 0 through 1023, write subframe common header (Table 2), write key subframe header (Table 3), write key subframe packed payload; 3. Write frame header, delta frame (Table 4); 4. For subframes 0 through 1023, write subframe common header (Table 2), and write delta subframe packed payload.

TABLE 1

Compression Configuration Message

| Bits | Field Name | Description |
|---|---|---|
| 63 | Compression Mode | 0 = Lossless, 1 = Lose 1 Bit |
| 62:61 | Lookback Depth | This field specifies the number of frames the compressor can look back in frame history when generating the frame deltas. 0 = 1 frame, 1 = 2 frames, 2 = 3 frames, 3 = 4 frames |
| 60 | Use Range Encoding | When this field is set to true, 0 = False, 1 = True |
| 59:56 | Reserved | |
| 55:48 | Subframe Row Size | Subframe row dimension size, valid values are 2, 4, 8, 16, 32, 64, 128 |
| 47:40 | Subframe Column Size | Subframe column dimension size, |
| 39:32 | Reserved | |
| 31:16 | Key Frame Period | This field specifies the frequency at which key frames are generated by the compressor. The default value is 512, or about once per second using a 500 Hz sensor. |
| 15:0 | Reserved | |

This message of Table 1 should be placed at the beginning of each compressed data stream so that software/hardware can be configured correctly to decompress sensor 12 imagery.

TABLE 2

Common Subframe Header (for key and delta subframes)

| Bits | Field Name | Description |
|---|---|---|
| 7 | Arithmetic Representation | If this bit is set to true, an arithmetic representation was used to encode the sub-frame. Note it is not clear if we will want to implement arithmetic encoding in the FPGA due to the added scope and complexity. If we choose not to implement this, this bit in header can be re-purposed to a 3-bit frame look-back from a 2-bit frame look-back. 0 = True, 1 = False |
| 6:5 | Frame Look-back | This field specifies the lookback depth used to compute the sub-frame pixel delta |
| 4:0 | Pixel Size | This field specifies the pixel width of the subframe, 0 to 16 bits for unsigned subframes (key frames) and 0 to 17 bits for signed subframes (delta frames). |

TABLE 3

Key Subframe specific header

| Bits | Filed Name | Description |
|---|---|---|
| 15:0 | Pixel Offset | Unsigned 16-bit number that represents minimum pixel value in the key subframe encoded. |

TABLE 4

Frame Header Message

| Bits | Field Name | Description |
|---|---|---|
| 0:1 | Frame ID | 0 => Key Frame, 1 => Delta Frame, 2 => Key Frame 1-bit loss, 3 => Delta Frame 1-bit loss |
| 2:7 | Reserved | |

This message should be populated and written at the beginning of each compressed sensor frame.

The Key Subframe Pixel Size Compression Instructions (Function 1) may include:

```
Function Compute_Subframe_Pixel_Size
    (Max : Unsigned_Pixel_16_Bit_Type;
    Min  : Unsigned_Pixel_16_Bit_Type) return Unsigned_16 is
Use type Unsigned_Pixel_16Bit_Type;
    Dynamic_Range : constant Unisgned_Pixel_16_Bit_Type :=
Max − Min; Pixel_Size : Unsigned_16;
    begin
    case Dynamic_Range is
        when 0 =>
            Pixel_Size := 0;
        when 2 ** 0 =>
            Pixel_Size := 1;
        when 2 ** 1 .. 2 ** 2 − 1 =>
            Pixel_Size := 2;
        when 2 ** 2 .. 2 ** 3 − 1 =>
            Pixel_Size := 3;
        when 2 ** 3 .. 2 ** 4 − 1 =>
            Pixel_Size := 4;
        when 2 ** 4 .. 2 ** 5 − 1 =>
            Pixel_Size := 5;
        when 2 ** 5 .. 2 ** 6 − 1 =>
            Pixel_Size := 6;
        when 2 ** 6 .. 2 ** 7 − 1 =>
            Pixel_Size := 7;
        when 2 ** 7 .. 2 ** 8 − 1 =>
            Pixel_Size := 8;
        when 2 ** 8 .. 2 ** 9 − 1 =>
            Pixel_Size := 9;
        when 2 ** 9 .. 2 ** 10 − 1 =>
            Pixel_Size := 10;
        when 2 ** 10 .. 2 ** 11 − 1 =>
            Pixel_Size := 11;
        when 2 ** 11 .. 2 ** 12 − 1 =>
            Pixel_Size := 12;
        when 2 ** 12 .. 2 ** 13 − 1 =>
            Pixel_Size := 13;
        when 2 ** 13 .. 2 ** 14 − 1 =>
            Pixel_Size := 14;
        when 2 ** 14 .. 2 ** 15 − 1 =>
            Pixel_Size := 15;
        when others =>
            Pixel_Size := 16;
    end case;
    return Pixel_Size;
end Compute_Subframe_Pixel_Size.
```

The Delta Subframe Pixel Size Compression Instructions (Function 2) may include:

```
function Compute_Subframe_Pixel_Size (Max
            :Signed_Pixel_17_Bit_Type;
    Min     :Signed_Pixel_17_Bit_Type)
    return Subframe_Pixel_Size_Type is
    use type Signed_Pixel_17_Bit_Type; Pixel_Size :
    Subframe_Pixel_Size_Type;
    begin
        if Max = 0 and Min =0 then
            Pixel_Size := 0;
        elsif Min >= −2 ** 0 and Max <= 2 ** 0 − 1 then
            Pixel_Size := 1;
        elsif Min >= 2 ** 1 and Max <= 2 ** 1 − 1 then
            Pixel_Size := 2;
        elsif Min >= −2 ** 2 and Max <= 2 ** 2 − 1 then
            Pixel_Size := 3;
        elsif Min >= −2 ** 3 and Max <= 2 ** 3 − 1 then
            Pixel_Size := 4;
        elsif Min >= −2 ** 4 and Max <= 2 ** 4 − 1 then
            Pixel_Size := 5;
        elsif Min >= −2 ** 5 and Max <= 2 ** 5 − 1 then
            Pixel_Size := 6;
    elsif Min >= −2 ** 6 and Max <= 2 ** 6 − 1 then
        Pixel_Size := 7;
    elsif Min >= −2 ** 7 and Max <= 2 ** 7 − 1 then
        Pixel_Size := 8;
    elsif Min >= −2 ** 8 and Max <= 2 ** 8 − 1 then
        Pixel_Size := 9;
        elsif Min >= −2 ** 9 and Max <= 2 ** 9 − 1 then
            Pixel_Size := 10;
    elsif Min >= −2 ** 10 and Max <= 2 ** 10 − 1 then
        Pixel_Size := 11;
    elsif Min >= −2 ** 11 and Max <= 2 ** 11 − 1 then
        Pixel_Size := 12;
    elsif Min >= −2 ** 12 and Max <= 2 ** 12 − 1 then
        Pixel_Size := 13;
    elsif Min >= −2 ** 13 and Max <= 2 ** 13 − 1 then
        Pixel Size := 14;
    elsif Min >= −2 ** 14 and Max <= 2 ** 14 − 1 then
        Pixel_Size := 15;
    elsif Min >= −2 ** 15 and Max <= 2 ** 15 − 1 then
        Pixel_Size := 16; else
        Pixel_Size := 17; end if;
    return Pixel_Size;
end Compute_Subframe_Pixel_Size;
```

FIG. 3 depicts a subframe (labeled subframe) for compression of the sun in an image collected by sensor 12. The pixels of the frame are represented as two bits each or one bit with one bit precision loss. The subframe reduces in size from 128 bytes to 9 bytes (eight bytes for pixels, one byte for the subframe header) for an 8×8 pixel subframe. The pixel values in frame one are represented by a small table of three rows in three columns. Each cell in the respective table includes a value corresponding to intersection of a row and a column. For example, the cell in the first column and the first row is equal to 5,866. The cell in the second column and the first row is equal to 14,072. The cell in the third column and the first row is equal to 14,638. A table associated with a second frame is additionally presented. The frame delta is determined by subtracting the second frame from the first frame. More particularly, the table associated with the frame delta subtracts cells of the second frame from corresponding cells in the first frame. For example, in the table of the frame deltas, the cell associated with the first column and the first row is zero because Frame 2 minus Frame 1 is 5,866 minus 5,866 equals zero. The cell of the frame delta for the second column, first row is zero because 14,072 minus 14,072 equals zero. The frame delta cell associated with the third column, first row is one because 14,639 minus 14,638 equals one. The frame delta cell associated with the first column, second row is negative two because 5,559 minus 5,561 equals −2. The frame delta cell associated with the second column, second row equals negative two because 13,930 minus 13,932 equals −2. The frame delta cell associated with the third column, second row is negative one because 14,203 minus 14,204 equals −1. The frame delta cell associated with the first column, third row is one because 5,009 minus 5,008 equals one. The frame delta cell associated with the second column, third row is negative two because 7,591 minus 7,593 equals −2. The frame delta cell associated with the third column, third row is one because 13,602 minus 13,601 is 1.

Figure 4:
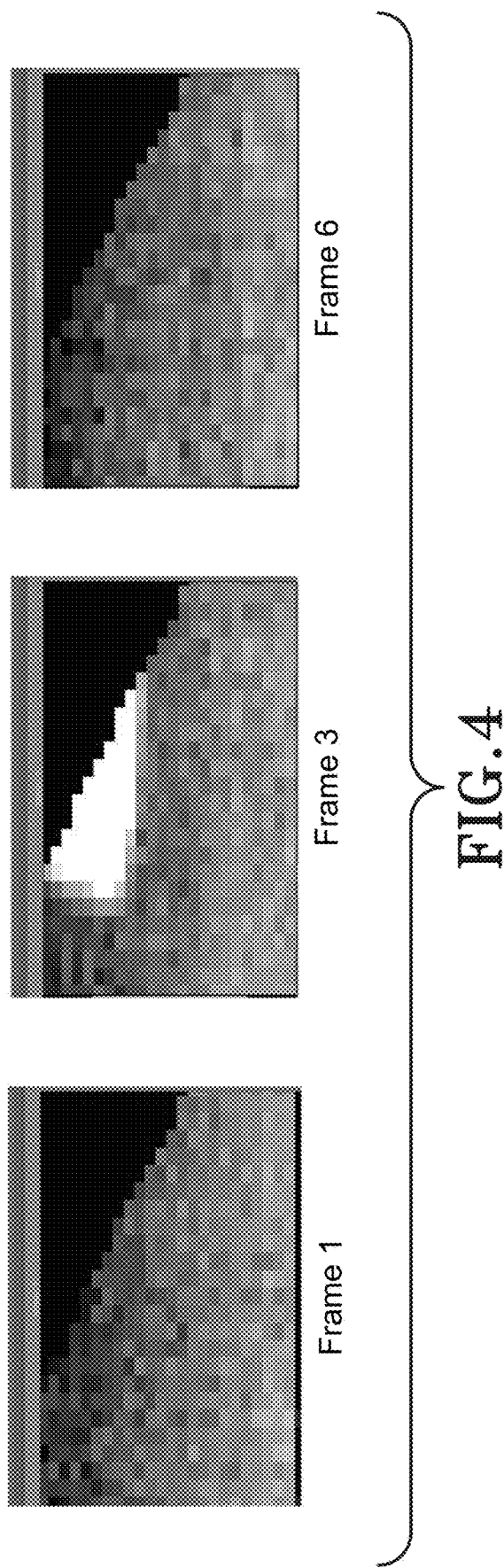
FIG. 4 depicts three images from a first frame, a third frame, and a sixth frame, and a temporary obstruction is shown in the third frame corresponding to a helicopter rotor.

FIG. 4 depicts an example of the subframe lookback history. Frame six is compressed using the delta from frame one rather than frame three. By compressing frame six from the delta of frame one, the increased dynamic range introduced by the helicopter rotor 18 is eliminated.

FIG. 5 depicts a table indicating compression performance of the compression instructions detailed above on trolling flights of the helicopter 10 carrying sensor 12 collecting the imagery data. The compression ratio is determined by dividing the raw data size by the compressed data size. For example, a first flight achieved a compression ratio of about 5.03 (1,883.5/374.3=5.03). Compression ratios obtained by executing the instructions to implement the compression instructions or process provided herein achieve compression ratios near five. More particularly, the compression ratios are at least 4.67. The greatest compression ratios achieved by the compression instructions or process provided herein was 5.04.

Figure 6:
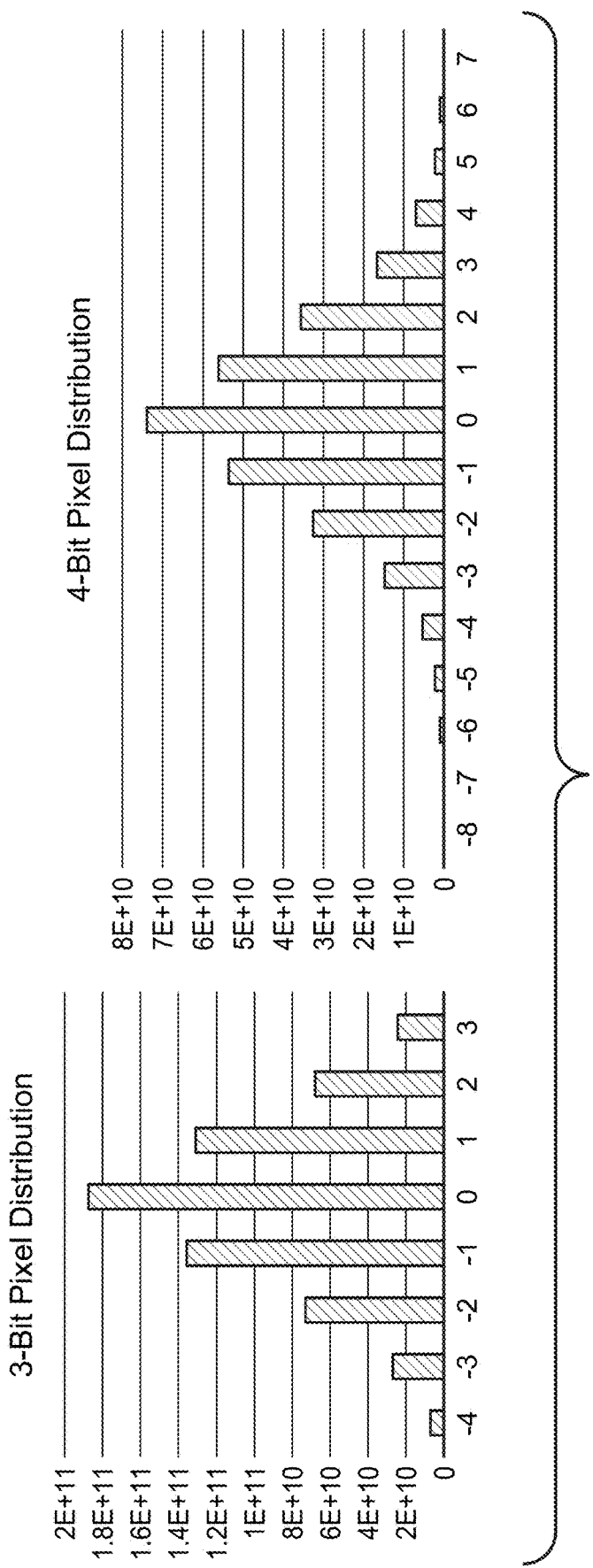
FIG. 6 depicts a 3-bit pixel distribution graph and a 4-bit pixel distribution graph.

FIG. 6 depicts a three-bit pixel distribution bar graph and a four-bit pixel distribution bar graph. Values along the X-axis of each bar graph represent the frame delta values. I-axis represents the number of values obtained. Pixel probability distributions indicate that about 95% of the compressed storage resides in three-bit and four-bit subframes. In one particular embodiment, it may be possible to increase the compression ratio by utilizing entropy encoding. More specifically, base-8 and base-16 range in coding.

FIG. 7 depicts a table introducing new compression ratios utilizing entropy encoding. The entropy encoding is labeled as the new compression ratio. For example, with respect to Flight 1, utilizing base-8 and base-16 entropy encoding, a new compression ratio can be achieved equal to 5.33. Entropy encoding refers to an additional compression step ran subsequent to the compression process or instructions discussed above to increase the overall compression ratio. Entropy encoding is typically the last step of an overall compression process instructions.

Figure 8:
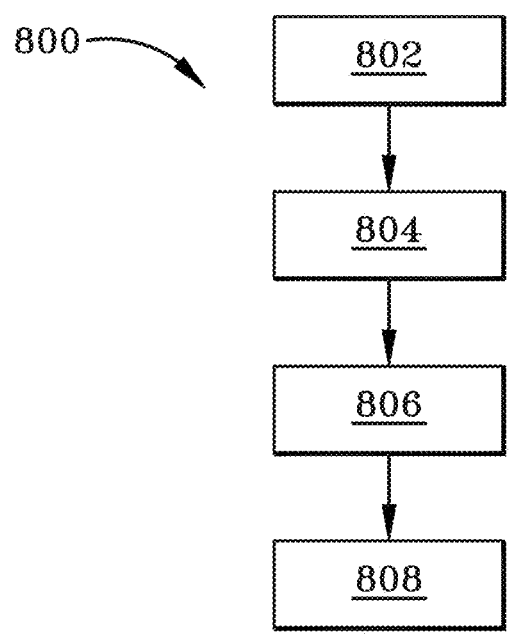
FIG. 8 is a flow chart depicting an exemplary method for high frame rate image compression in accordance with one aspect of the present disclosure.

FIG. 8 depicts a method for high frame rate imagery compression generally at 800. Method 800 includes encoding frame deltas to decrease pixel dynamic range, which is shown generally at 802. Method 800 includes localizing frame deltas, which is shown generally at 804. Method 800 includes encoding subframes with lookback history to further decrease pixel dynamic range for temporary obstructions, which is shown generally at 806. The high frame rate imagery compression achieves 4:1 lossless compression, which is shown generally at 808.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Key frame," as used herein, refers to a collection of sub-frames using unsigned pixels. In each sub-frame header, the pixel size, and minimum pixel value of the subframe is encoded. In the sub-frame payload, the unsigned positive delta of pixel_value–minimum_pixel_value is encoded. "Delta frame," as used herein, refers to a collection of sub-frames using signed pixels. In each sub-frame header, the pixel size and sub-frame lookback depth used to generate the delta is encoded. In the sub-frame payload, the pixel delta is encoded using the lookback depth specified in the sub-frame header and the current pixel value.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A system for lossless compression of high frame rate imagery comprising:
   a sensor adapted to capture imagery data;
   at least one non-transitory computer readable storage medium in electrical communication with the sensor, the at least one non-transitory computer readable storage medium having instructions encoded thereon that, when executed by at least one processor, implement operations to compress high frame rate imagery in a lossless manner, the at least one non-transitory computer readable storage medium including:
   logic to encode frame deltas to decrease pixel dynamic range;
   logic to localize frame deltas;
   logic to encode subframes with lookback history to further decrease pixel dynamic range for temporary obstructions;
   logic to loop through subframes;
   logic to find maximum and minimum value in each subframe;
   logic to encode minimum pixel value in a subframe header; and
   logic to subtract the minimum value in each subframe from the maximum value in the same subframe to define a subframe pixel size.

2. The system of claim 1, further comprising:
   key frames occurring once every 512 frames.

3. The system of claim 1, further comprising:
   logic to encode the subframe pixel size to the subframe header; and
   logic to subtract the subframe minimum from the subframe pixel size to determine unsigned pixels in a key frame.

4. The system of claim 3, further comprising:
   logic to subtract a first delta frame from the key frame;
   logic to loop through subframes;
   logic to find maximum and minimum delta pixel value in each subframe; and
   logic to subtract the minimum delta pixel value in each subframe from the maximum delta pixel value in the same subframe to define a delta frame pixel size.

5. The system of claim 4, further comprising:
   logic to encode the subframe pixel size to the subframe header; and
   logic to encode the delta frame with a lookback depth equal to one.

6. The system of claim 5, further comprising:
   logic to encode signed pixels to subframe payload.

7. The system of claim 6, further comprising:
logic to subtract a $N^{th}$ delta frame from a N−1 delta frame, wherein N is any integer greater than seven;
logic to loop through subframes of the $N^{th}$ delta frame;
logic to find maximum and minimum delta pixel values for lookback depths from one to eight.

8. The system of claim 7, further comprising:
logic to select a lookback depth that generates the minimum delta pixel value.

9. The system of claim 8, further comprising:
logic to encode the subframe pixel size to the subframe header;
logic to encode the subframe lookback depth to the subframe header;
logic to encode signed pixels to the subframe payload.

10. A method for high frame rate imagery compression comprising:
encoding frame deltas to decrease pixel dynamic image;
localizing frame deltas;
encoding subframes with lookback history to further decrease pixel dynamic range for temporary obstructions;
achieving 4:1 lossless compression with the high frame rate imagery compression;
looping through subframes;
determining maximum and minimum value in each subframe;
encoding minimum pixel value in a subframe header; and
subtracting the minimum value in each subframe from the maximum value in the same subframe to define a subframe pixel size.

11. The method of claim 10, further comprising:
effecting key frames to occur once every 512 frames.

12. The method of claim 10, further comprising:
encoding the subframe pixel size to the subframe header; and
subtracting the subframe minimum from the subframe pixel size to determine unsigned pixels in a key frame.

13. The method of claim 12, further comprising:
subtracting a first delta frame from the key frame;
looping through subframes;
determining maximum and minimum delta pixel value in each subframe; and
subtracting the minimum delta pixel value in each subframe from the maximum delta pixel value in the same subframe to define a delta frame pixel size.

14. The method of claim 13, further comprising:
encoding the subframe pixel size to the subframe header; and
encoding the delta frame with a lookback depth equal to one.

15. The method of claim 14, further comprising:
encoding signed pixels to subframe payload.

16. The method of claim 15, further comprising:
subtracting a N delta frame from a N−1 delta frame, wherein N is any integer greater than seven;
looping through subframes; and
determining maximum and minimum delta pixel values for lookback depths from one to eight.

17. The method of claim 16, further comprising:
selecting a lookback depth that generates the minimum delta pixel value.

18. The system of claim 17, further comprising:
encoding the subframe pixel size to the subframe header;
encoding the subframe lookback depth to the subframe header; and
encoding signed pixels to the subframe payload.

* * * * *